UNITED STATES PATENT OFFICE.

FREDERICK KLETT, OF PHILADELPHIA, PENNSYLVANIA.

IMPROVEMENT IN THE MANUFACTURE OF FERTILIZERS.

Specification forming part of Letters Patent No. 49,891, dated September 12, 1865.

*To all whom it may concern:*

Be it known that I, FREDERICK KLETT, of the city and county of Philadelphia, and State of Pennsylvania, have made certain new and useful Improvements in Producing Fertilizers; and I do hereby declare the following to be a clear and exact description of the same.

My object is the decomposition of feldspar or other minerals containing potassa or soda, or both, so as to utilize the said component parts for the purpose of fertilizing in the condition which they assume as the result of the operation.

Feldspar, as is well known, consists of alumina, silica, potassa, and sometimes soda; and it is my object to decompose this compound so as to obtain a soluble silicate of lime and alumina and a phosphate of potassa or soda, which I do in the following manner:

To every one part of the mineral I use two parts carbonate or hydrate of lime; and for every one part of alkali contained in the mineral two parts of fluoride of calcium, (natural or artificial—such, for instance, as results from the decomposition of cryolite by lime,) and one (1) part phosphate of lime or iron to every one part of mineral, the above to be varied according to the mineral combination, then calcined in a furnace at a red heat for about five hours.

The phosphate of lime or iron can be left out in the above mixture and added after calcination. The mixture, being calcined again in connection with the added phosphate or a biphosphate of lime, may be added to the above mixture after calcination to convert the potash and soda into phosphates.

The advantage to be derived from my invention is, the production of a fertilizer from a material hitherto almost worthless for this purpose, at the same time giving the farmer a sure source of supply of this compound fertilizer, which has been the long-desired object.

Having thus described my invention, what I claim as new therein, and desire to secure by Letters Patent, is—

The making of a fertilizer, substantially as herein set forth.

The above specification of my improvement in producing fertilizers signed this 7th day of April, 1865.

FREDK. KLETT.

Witnesses:
JAMES McCALUN,
ALFRED MONNIER.